(12) United States Patent
Ramsay et al.

(10) Patent No.: US 10,877,171 B2
(45) Date of Patent: Dec. 29, 2020

(54) WAVELET ESTIMATION FOR FOUR-DIMENSIONAL CHARACTERIZATION OF SUBSURFACE PROPERTIES BASED ON DYNAMIC SIMULATION

(71) Applicant: Landmark Graphics Corporation, Houston, TX (US)

(72) Inventors: Travis St. George Ramsay, Hockley, TX (US); Felix Rafael Segovia, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 545 days.

(21) Appl. No.: 15/567,225

(22) PCT Filed: Dec. 9, 2016

(86) PCT No.: PCT/US2016/065800
§ 371 (c)(1),
(2) Date: Oct. 17, 2017

(87) PCT Pub. No.: WO2018/106257
PCT Pub. Date: Jun. 14, 2018

(65) Prior Publication Data
US 2018/0292552 A1 Oct. 11, 2018

(51) Int. Cl.
*G01V 1/28* (2006.01)
*G01V 1/30* (2006.01)
(Continued)

(52) U.S. Cl.
CPC .............. *G01V 1/282* (2013.01); *E21B 49/00* (2013.01); *G01V 1/308* (2013.01); *G01V 1/50* (2013.01);
(Continued)

(58) Field of Classification Search
None
See application file for complete search history.

(56) References Cited

U.S. PATENT DOCUMENTS 4,679,174 A 7/1987 Gelfand
8,451,683 B2 5/2013 Chu et al.
(Continued)

OTHER PUBLICATIONS

Auger, Anne, and Nikolaus Hansen. "Tutorial CMA-ES: evolution strategies and covariance matrix adaptation." GECCO (Companion). 2012.
(Continued)

*Primary Examiner* — Justin C Mikowski
(74) *Attorney, Agent, or Firm* — Tenley Krueger; Baker Botts L.L.P.

(57) ABSTRACT

Wavelet estimation may be performed in a reservoir simulation model that is constrained by seismic inversion data and well logs. A synthetic seismic trace is generated along with an estimated wavelet. The reservoir simulation model is revised based on results from model comparisons to actual data or base seismic data and is then used to perform a wavelet estimation. The estimated wavelet may then be used to plan further production at the well site environment, additional production at additional well site environments or any other production and drilling operation for any given present or future well site environment.

20 Claims, 6 Drawing Sheets

(51) Int. Cl.
*G01V 1/50* (2006.01)
*G06F 30/00* (2020.01)
*E21B 49/00* (2006.01)
*G06F 30/20* (2020.01)
*G06F 111/10* (2020.01)

(52) U.S. Cl.
CPC ............. *G06F 30/00* (2020.01); *G01V 1/306* (2013.01); *G01V 2210/121* (2013.01); *G01V 2210/1293* (2013.01); *G01V 2210/1295* (2013.01); *G01V 2210/1423* (2013.01); *G01V 2210/1425* (2013.01); *G01V 2210/1429* (2013.01); *G01V 2210/161* (2013.01); *G01V 2210/614* (2013.01); *G01V 2210/6122* (2013.01); *G01V 2210/6169* (2013.01); *G01V 2210/624* (2013.01); *G01V 2210/6226* (2013.01); *G01V 2210/644* (2013.01); *G01V 2210/645* (2013.01); *G01V 2210/663* (2013.01); *G06F 30/20* (2020.01); *G06F 2111/10* (2020.01)

(56) References Cited

U.S. PATENT DOCUMENTS

| | | | |
|---|---|---|---|
| 2007/0005253 | A1 | 1/2007 | Fornel et al. |
| 2008/0285383 | A1 | 11/2008 | An |
| 2013/0223187 | A1* | 8/2013 | Thapar .................. G01V 1/345 367/73 |
| 2014/0102694 | A1 | 4/2014 | Hargreaves et al. |
| 2016/0116637 | A1* | 4/2016 | Blanchard ............. G01V 1/306 703/2 |
| 2016/0161619 | A1 | 6/2016 | Holschuh et al. |
| 2017/0139065 | A1* | 5/2017 | Gentilhomme ........ G01V 1/282 |
| 2017/0140079 | A1* | 5/2017 | Gentilhomme ........ G01V 1/282 |
| 2017/0337302 | A1* | 11/2017 | Mezghani ............ G01V 99/005 |
| 2018/0113086 | A1* | 4/2018 | Oliver ................ E21B 41/0092 |

OTHER PUBLICATIONS

Emerick, Alexandre Anozé, Rafael Moraes, and Jose Rodrigues. "Calculating seismic attributes within a reservoir flow simulator." Latin American & Caribbean Petroleum Engineering Conference. Society of Petroleum Engineers, 2007.

Lafet, Y., et al. "Global 4-D Seismic Inversion and Fluid Prediction." 70th Conference and Exhibition of European Association of Geoscientists and Engineers (Expanded Abstract), Rome, June. vol. 9. 2008.

Pendrel, John. "Seismic inversion—a critical tool in reservoir characterization." Scandinavian oil-gas magazine 5.6 (2006): 19-22.

Thore, P., and T. D. Blanchard. "4D wavelet estimation." SEG Technical Program Expanded Abstracts 2014. Society of Exploration Geophysicists, 2014. 4878-4882.

Walden, Andrew T., and Roy E. White. "Seismic wavelet estimation: a frequency domain solution to a geophysical noisy input-output problem." IEEE transactions on Geoscience and Remote Sensing 36.1 (1998): 287-297.

White, R. E., and Rob Simm. "Tutorial: Good practice in well ties." First Break 21.10 (2003).

Bo, Y. Yi, et al. "Comparison of wavelet estimation methods." Geosciences Journal 17.1 (2013): 55.

Heuvelink, Gerard, and Daniel A. Griffith. Space-Time Geostatistics for Geography: A Case Study of Radiation Monitoring Across Parts of Germany. Geographical Analysis 42.2 (2010): 161-179.

CGG Worldwide, "Seismic Reservoir Characterization—RockMod" Data Sheet, 2 pages.

CGG Worldwide, "Seismic Reservoir Characterization—StatMod" Data Sheet, 2 pages.

International Search Report and Written Opinion issued in related PCT Application No. PCT/US2016/065800 dated Aug. 28, 2017, 10 pages.

* cited by examiner

WAVELET ESTIMATION FOR FOUR-DIMENSIONAL CHARACTERIZATION OF SUBSURFACE PROPERTIES BASED ON DYNAMIC SIMULATION

CROSS-REFERENCE TO RELATED APPLICATION

The present application is a U.S. National Stage Application of International Application No. PCT/US2016/065800 filed Dec. 9, 2016, which is incorporated herein by reference in its entirety for all purposes.

TECHNICAL FIELD

Embodiments of the present invention relate generally to seismic measurements for subsurface formations, and more particularly to wavelet estimation for four-dimensional characterization of subsurface properties based on dynamic simulation.

BACKGROUND

In hydrocarbon exploration, seismic energy may be generated and transmitted into formation positioned in an area of interest. Seismic waves may be reflected or refracted off the formations and recoded by acoustic receivers positioned in or near a wellbore at a surface or subsea. The seismic waves reflected from the formations may be sampled as seismic data and used to estimate the properties or characteristics of the formations in the area of interest. Seismic inversion involving wavelet estimation may be used to transform seismic data into one or more formation properties that quantitatively describe the subsurface.

Figure 1:
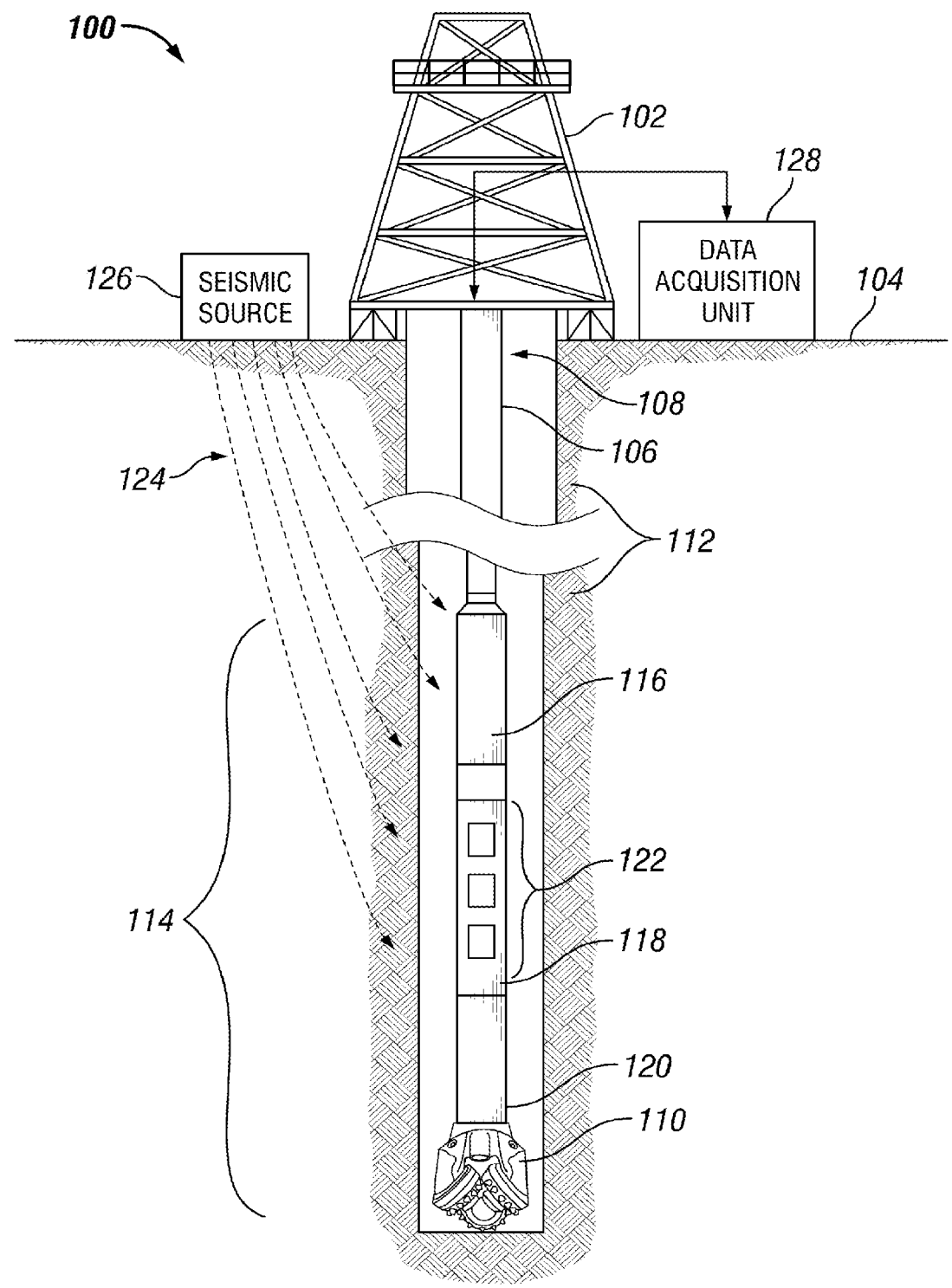
FIG. 1 is a cross-sectional schematic diagram depicting an example wellbore environment for acquiring seismic data and well log data to analyze subsurface properties over time, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells.

One or more embodiments are directed to wavelet estimation for time-lapse seismic survey data with the requisite purpose of performing seismic inversion in the monitor survey using pseudo well logs derived from petro-elastic modeling (PEM) techniques to generate more accurate mapping or analysis of one or more formation properties. Such wavelet estimation to execute seismic inversion workflow may be performed by one or more estimation methods including but not limited to seismic data only methods or combined well log and seismic data methods. A wavelet may be estimated by phase and amplitude spectra using well log and seismic data to produce a synthetic seismic trace based on the base or initial seismic data to obtain an accurate mapping or analysis of one or more formation properties over a two-way time interval.

While wavelet estimation in a base seismic survey may be performed using only seismic methods, subsequent phase rotation to the wavelet may yield a result that does not accurately reflect the subterranean formation or subsurface over elapsed time as a constant phase is assumed. For example, time-lapse seismic survey acquisition may be utilized to analyze changes in a reservoir or formation of interest, for example, subterranean formations. While changes near the wellbore may occur, production logs are not generally re-acquired after the onset of production requiring different methods to estimate the wavelet in a monitor survey that accurately considers phase and amplitude spectra for accurate dynamic reservoir characterization. Another technique of wavelet estimation uses a modeling based technique incorporating covariance matrix adaptative evolution strategy and applies Gaussian data space reduction to iteratively eliminate non-compliant models. However, such methods assume that production flows occur in a layered manner and that inversion is performed on a blocky model. In yet other methods, changes at the well location are assumed through fluid substitution which is governed by a rock physics model. However, with this method fluid dynamics associated with a production of hydrocarbons may not be considered, but rather, estimated changes in pressure response and fluid saturation may be used to drive the inversion of the monitor survey which may increase uncertainty. In one or more aspects of the present disclosure, wavelet estimation may be performed in a reservoir simulation model constrained by seismic data and utilizing well logs or well log data as the timing relationship between the monitor seismic and the calibrated reservoir simulation model is more coherent and may provide a more accurate description of the formation or the subsurface.

Various aspects of the present disclosure may be implemented in various environments. FIG. 1 is a cross-sectional schematic diagram depicting an example wellbore environment for acquiring seismic data and well log data for wavelet estimation for four-dimensional characterization of subsurface properties based on dynamic simulation, according to one or more aspects of the present disclosure. An example wellbore environment 100 for acquiring seismic data and well logs according to one or more aspects of the present disclosure is illustrated. The wellbore environment 100 includes a derrick 102 positioned at a surface 104. The derrick 102 may support components of the wellbore environment 100, including a drill bit 110 coupled to a drill string 106 that extends below the surface 104 in a wellbore 108.

The drill string 106 may comprise one or more downhole tools, for example, a bottom hole assembly 114, positioned on the drill string 106 uphole of the drill bit 110. The bottom hole assembly 114 includes a combination of various components, such as one or more drill collars 116, a downhole data collection tool 118, and a downhole motor assembly 120 for housing a motor for the drill bit 110. In some aspects, the downhole data collection may include an array of seismic sensors 122, such as geophones, or the seismic sensors 122 may engage with a wall of the wellbore 108. The seismic sensors 122 may operate in response to seismic waves 124 generated by a seismic source 126 positioned at the surface 104 proximate to the wellbore 108. The seismic source 126 may generate seismic energy to form the seismic waves 124 that may be transmitted from the surface 104 through the formation 112 adjacent to the wellbore 108. Seismic source 126 may comprise, but is not limited to, any one or more of an air gun, a plasma sound source, a weight-drop truck, one or more explosive devices, an electromagnetic pulse (EMP) energy source, and a seismic vibrator. One or more seismic waves 124 generated by the seismic source 126 may be reflected or refracted by the formation 112 and sampled by the seismic sensors 122 positioned on the seismic tool 118.

The one or more samples or information received by the seismic sensors 122 of the seismic tool 118 may be recorded and used by a data acquisition unit 128 at the surface 104 to acquire seismic data to provide information or data about one or more properties or characteristics of the formation 112. In one or more embodiments, the seismic sensors 122 may be configured to sample the seismic waves 124 reflected or refracted from the formation 112 at predetermined intervals of time. In one or more embodiments, the seismic source 126 may be configured to generate and transmit the seismic waves 124 at the predetermined time intervals. In one or more embodiments, the seismic data 104 may be generated by the seismic sensors 122 and stored in the data acquisition unit 128 once a week, a month, a quarter, a year or any other interval of time. In one or more embodiments, the seismic tool 118 may record vertical seismic profiling survey data and well log data. In one or more embodiments, any surface seismic data recorded by any one or more seismic tools 118 may occur prior to erecting derrick 102 or prior to any drilling at wellbore environment 100.

Several methods exist for downhole information collection of well log data, including logging while drilling ("LWD") and measurement-while drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably.

In one or more embodiments, one or more samples received by the seismic sensors 122 may be stored in a storage device or memory positioned downhole, for example, in a bottom hole assembly 114. The one more samples may be retrieved for analysis by a data acquisition unit 128 while downhole or for example, after retrieval of the bottom hole assembly 114. In one or embodiments, seismic tool 118 may be communicatively coupled to the data acquisition unit 128 by any suitable device or mechanism including, but not limited to, wired, wireless, fiber optic, telemetry, any other communication device or mechanism or any combination thereof. While only one data acquisition unit 128 is shown, the wellbore environment 100 may include any number of devices or tools for acquiring information or data from the seismic tool 118, such as one or more information handling systems. In one or more embodiments, any one or more devices or components illustrated as positioned on the surface 104 (for example, the seismic source 126 and the data acquisition unit 128) and any one or more of these devices illustrated downhole as positioned downhole in the wellbore 108 (for example, in seismic tool 118) may be positioned at the surface 104, within the wellbore 108 or any combination of at the surface 104 or within the wellbore 108.

Figure 2:
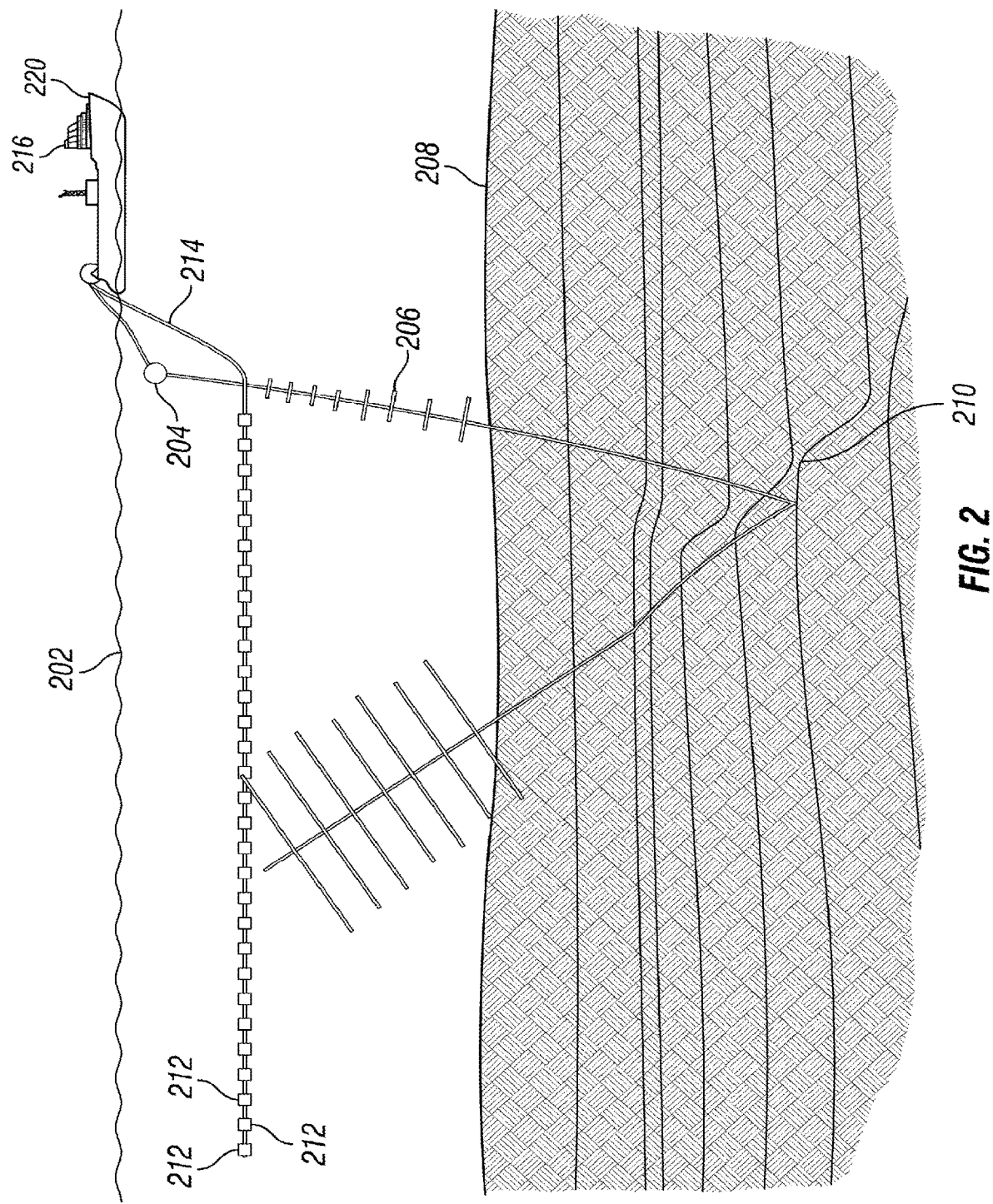
FIG. 2 is a cross-sectional schematic diagram depicting an example of a marine environment for acquiring seismic data for wavelet estimation for four-dimensional characterization of subsurface properties based on dynamic simulation, according to one or more aspects of the present disclosure.

FIG. 2 is a cross-sectional schematic diagram depicting an example of a marine environment for acquiring seismic data to analyze subsurface reflective properties in two-way time according to aspects of the present disclosure. A seismic acquisition environment 200 may comprise a seismic vessel 220. Seismic vessel 220 may tow one or more seismic sources 204, such as an impulse source or a vibratory source. The seismic sources 204 may transmit seismic waves 206 through the ocean floor 208. The seismic waves 206 may be reflected or refracted off subterranean formations 210 below the ocean floor 208 and received by an array of seismic sensors 212, such as hydrophones, trailing behind the seismic vessel 220 on one or more streamers 214. In some aspects, the streamers 214 may include electrical or fiber-optical cabling for connecting the array of sensors 212 to seismic equipment on the ship 100, including a data acquisition unit 216. The sensors 212 may measure the reflections of the seismic waves 124 and transmit the measurements through the streamers 214 for storage in the data acquisition unit 216. Data acquisition unit 216 may be similar to data acquisition unit 128 and may comprise one or more information handling systems.

Figure 3:
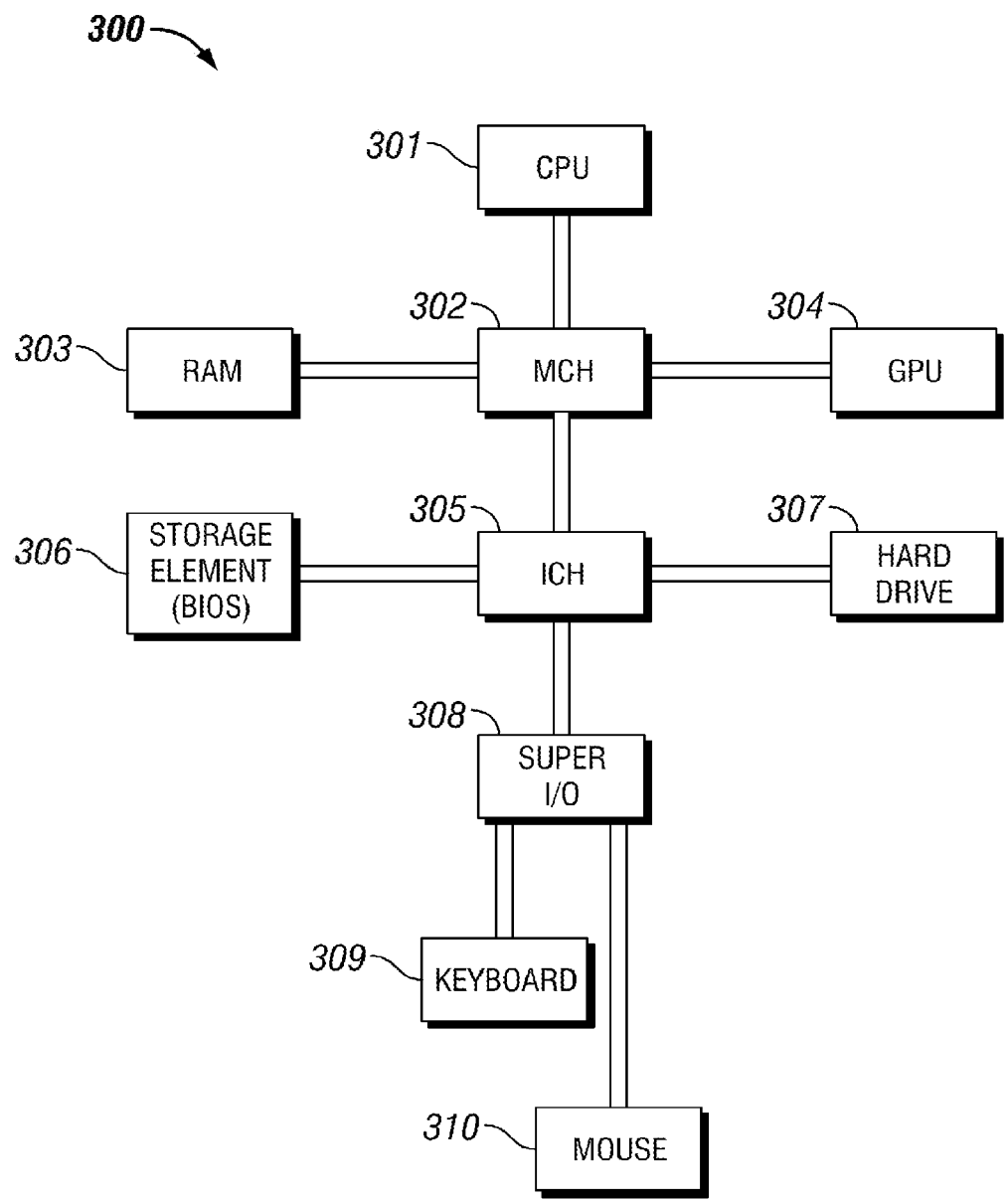
FIG. 3 is a diagram illustrating an example information handling system, according to one or more aspects of the present disclosure.

FIG. 3 is a diagram illustrating an example information handling system, according to one or more aspects of the present disclosure. The data acquisition unit 216 or data acquisition unit 128 may take a form similar to the information handling system 300. A processor or central processing unit (CPU) 301 of the information handling system 300 is communicatively coupled to a memory controller hub or north bridge 302. The processor 301 may include, for example a microprocessor, microcontroller, digital signal processor (DSP), application specific integrated circuit (ASIC), or any other digital or analog circuitry configured to interpret and/or execute program instructions and/or process data. Processor 301 may be configured to interpret and/or execute program instructions or other data retrieved and stored in any memory such as memory 303 or hard drive 307. Hard drive 307 may include, but is not limited to, a hard disk drive, an optical drive or any other non-transient storage medium or computer-readable media as discussed above. Program instructions or other data may constitute portions of a software or application for carrying out one or more methods or embodiments described herein. Memory 303 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software or application may be retrieved and stored in memory 303 for execution by processor 301.

Modifications, additions, or omissions may be made to FIG. 3 without departing from the scope of the present disclosure. For example, FIG. 3 shows a particular configuration of components of information handling system 300. However, any suitable configurations of components may be used. For example, components of information handling system 300 may be implemented either as physical or logical components. Furthermore, in some embodiments, functionality associated with components of information handling system 300 may be implemented in special purpose circuits or components. In other embodiments, functionality associated with components of information handling system 300 may be implemented in configurable general purpose circuit or components. For example, components of information handling system 300 may be implemented by configured computer program instructions.

Memory controller hub (MCH) 302 may include a memory controller for directing information to or from various system memory components within the information handling system 300, such as memory 303, storage element 306, and hard drive 307. The memory controller hub 302 may be coupled to memory 303 and a graphics processing unit (GPU) 304. Memory controller hub 302 may also be coupled to an I/O controller hub (ICH) or south bridge 305. I/O controller hub 305 is coupled to storage elements of the information handling system 300, including a storage element 306, which may comprise a flash ROM that includes a basic input/output system (BIOS) of the computer system. I/O controller hub 305 is also coupled to the hard drive 307 of the information handling system 300. I/O controller hub 305 may also be coupled to a Super I/O chip 308, which is itself coupled to several of the I/O ports of the computer system, including keyboard 309 and mouse 310.

Figure 4:
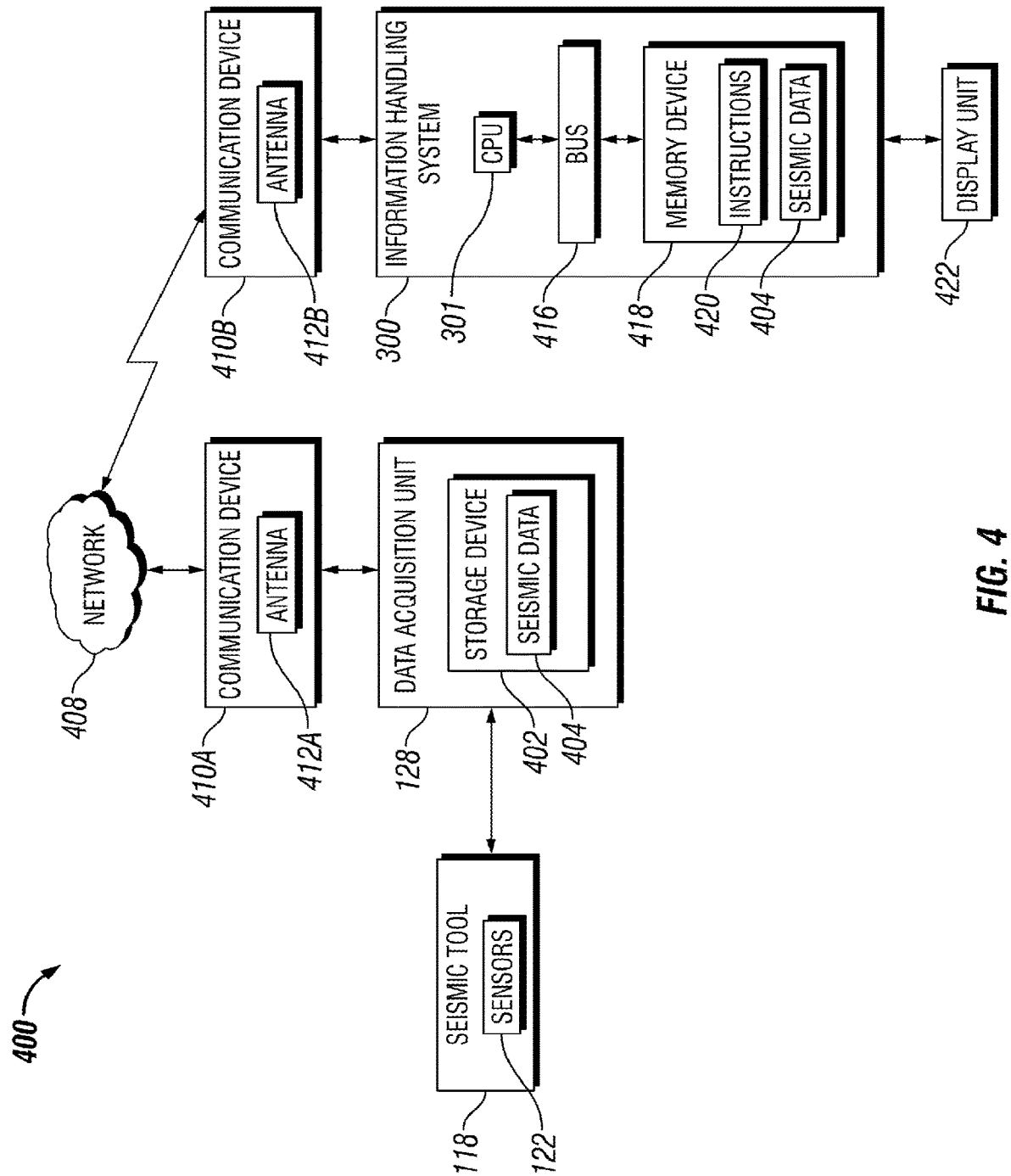
FIG. 4 is a diagram illustrating a system for creating base seismic data, according to one or more aspects of the present disclosure.

FIG. 4 is a diagram illustrating a system for creating base seismic data, according to one or more aspects of the present disclosure. A system 400 for acquiring sample information or seismic data 404 includes a data acquisition unit 128. The data acquisition unit 128 is coupled to the seismic tool 118 which may include one or more seismic sensors 122 for detecting seismic waves generated by a seismic source 126 as illustrated and discussed above with respect to FIG. 1. While reference is made to FIG. 1, the present disclosure contemplates using any one or more components from FIG. 2 or any other data acquisition unit, seismic tool, seismic sensor, other seismic equipment, or any combination thereof.

The data acquisition unit 128 may receive the sample information or samples from one or more sensors 122 of seismic tool 118 and store the sample information in a storage device 402. Storage device 402 may include but is not limited to a database, RAM, hard disk drive, optical drive, or any other non-transient storage medium. The storage device 402 may store the sample information generated from the seismic tool 118 as seismic data 404. In one or more embodiments, the seismic data 404 may include raw information from one or more sensors 122 of the seismic tool 118. In one or more embodiments, the seismic tool 118 or an intermediate device between the seismic tool 118 and the data acquisition unit 128 may include a processor or an information handling system (such as an information handling system 300) for processing any one or more portions of the sample information prior to transmitting the sample information to the data acquisition unit 128 for storage as seismic data 404.

The system 400 may also include an information handling system 300 that is communicatively coupled to the data acquisition unit 128. In one or more embodiments, the information handling system 300 may be positioned in a remote location away from a wellbore environment (for example, wellbore environments 100, 200 in FIGS. 1 and 2, respectively). In one or more embodiments, the seismic data 404 may be transmitted from the data acquisition unit 128 and stored in a memory device 418 of the information handling system 300 via a network 408. The data acquisition unit 128 and the information handling system 300 may be coupled to, comprise or include respective communication devices 410A and 410B. The communication devices 410A, 410B include or are coupled to antennas 412A and 412B, respectively. Antennas 412A and 412B may transmit and receive information via network 408. While network 408 is illustrated, the present disclosure contemplates any type of communication including but not limited to using a wired connection, wireless connection, portable storage devices, or any other type of communication suitable for a given environment or operation.

As discussed above with respect to FIG. 3, the information handling system 300 may include several components including but not limited to a processor 301, a bus 416, and a memory device 418. The processor 301 may execute one or more instructions or one or more programs or cause one or more operations to be performed for creating, collecting, generating, or storing base seismic data or monitor seismic data by using the seismic data 404 received from the data acquisition unit 128. The processor 301 may execute one or more instructions or one or more programs for creating the base seismic data or the monitor seismic data. The processor 301 may execute one or more instructions 420 stored in the memory device 418 to perform any one or more operations, according to one or more aspects of the present disclosure. The processor 301 may include one or more processors, one or more modules or components that are configured or operable to execute one or more instructions or software programs, or any other software, hardware or combination thereof configured or operable to acquire and process seismic data 404 according to one or more aspects of the present disclosure. Processor 301 may include, but is not limited to, a field-programmable gate array (FPGA), an application specific integrated circuit (ASIC), a microprocessor, or any combination thereof. The memory device 418 may comprise any type of storage device or medium that retains stored information or data when powered off, for example, a non-transitory storage medium. For example, memory device 418 may include any type of computer-readable media as discussed above. In one or more embodiments, at least a portion of the memory device 418 may store seismic data 404.

Figure 5A:
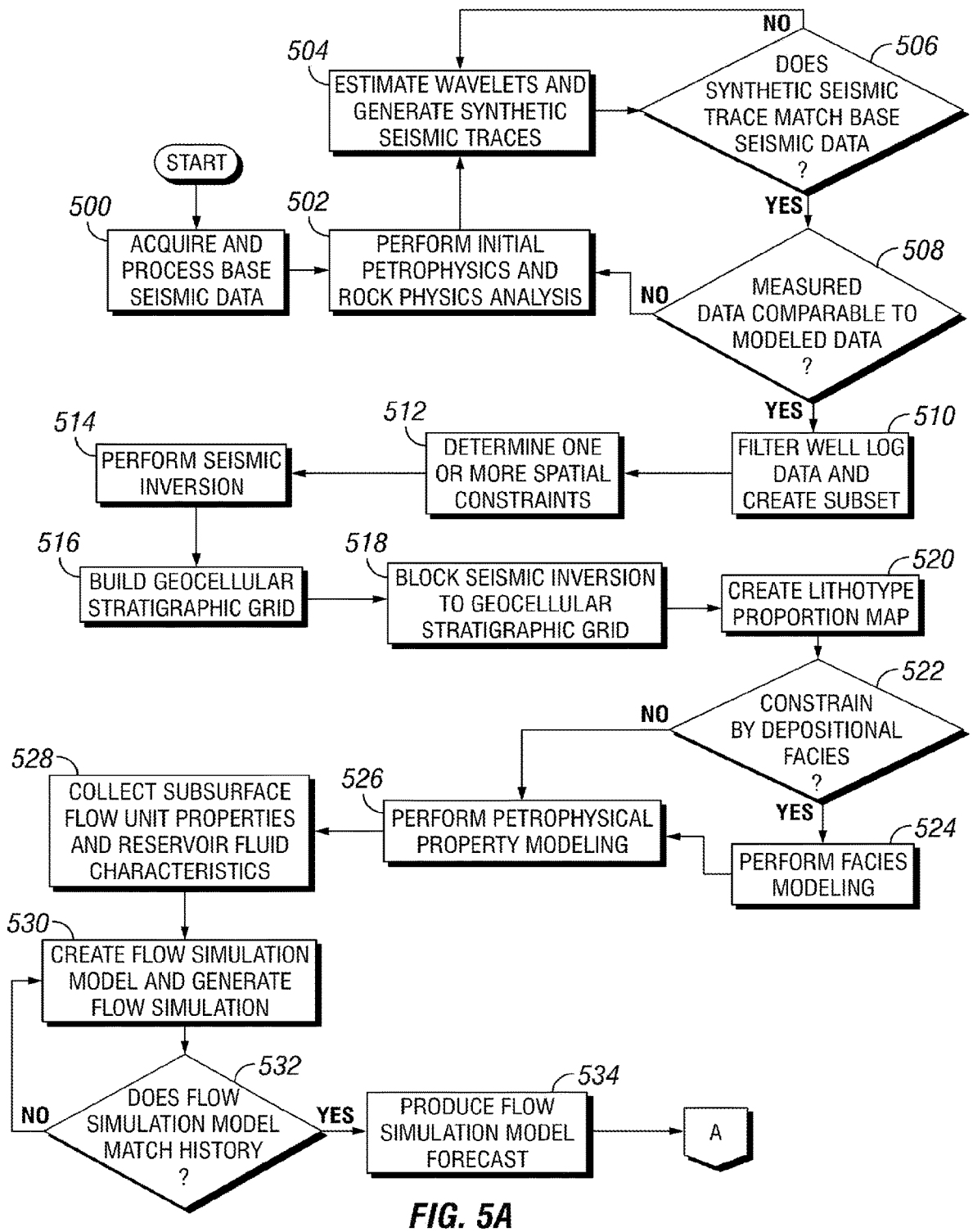
FIG. 5A and FIG. 5B show a flow chart illustrating wavelet estimation for derived seismic, according to one or more aspects of the present invention.
Figure 5B:
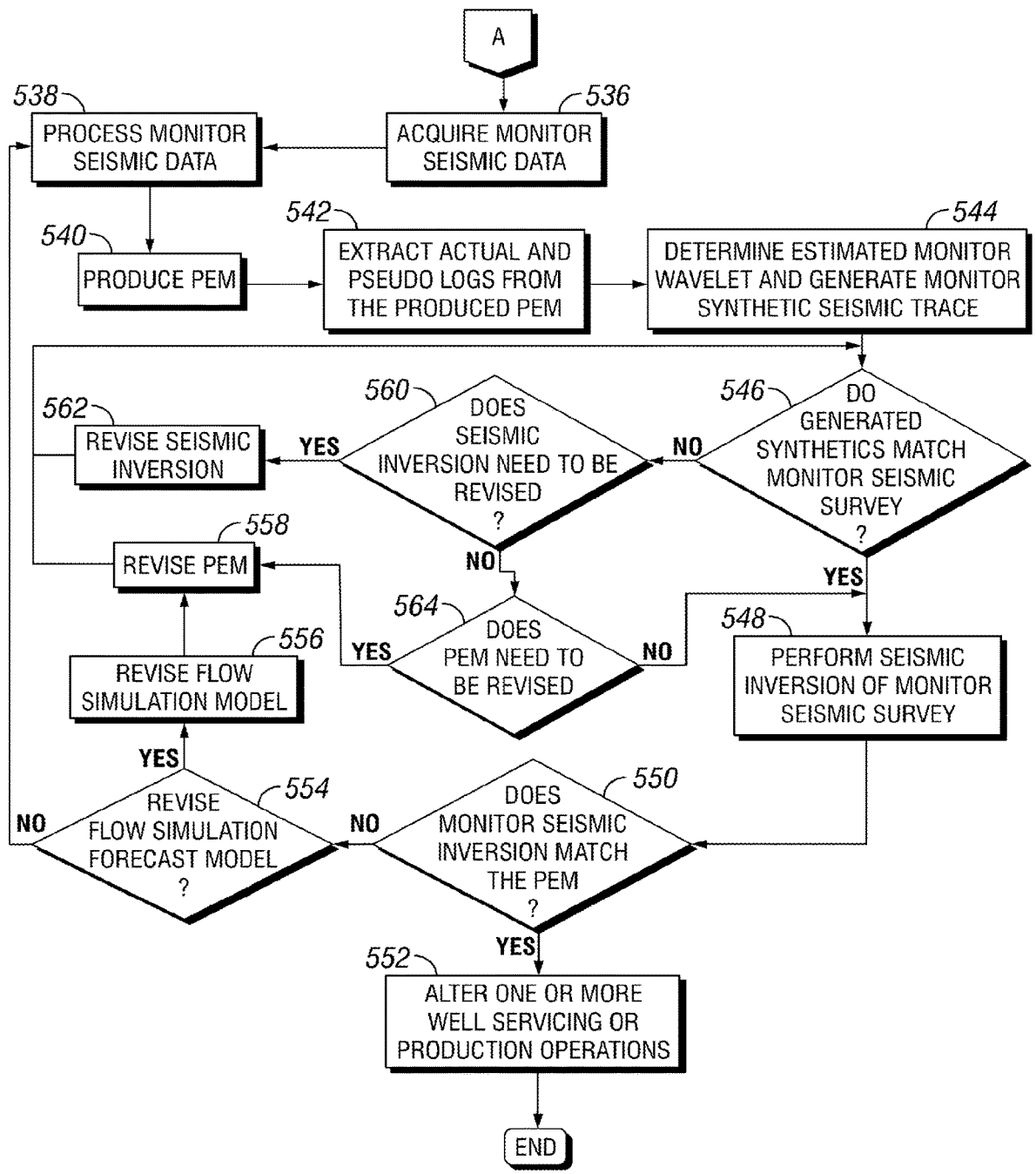

FIG. 5A and FIG. 5B show a flow chart illustrating wavelet estimation for derived seismic according to one or more aspects of the present invention. Wavelet estimation may be obtained for seismic data to aid in the production and management of a reservoir. At step 500, for a given instance of time base seismic data of an area of a subterranean formation is received or acquired and processed, for example seismic data 404 in FIG. 4. In one or more embodiments, sample information associated with a reservoir or formation of interest (for example, subterranean formation 210 of FIG. 2) may be acquired by or received from data acquisition units 216 from sensors 212 in FIG. 2 at a specific instance of time. The sample information may be stored as seismic data (for example seismic data 404 in FIG. 4) in a storage device (for example storage device 402 in FIG. 4). After acquisition by the data acquisition unit 128, the seismic data 404 may be communicated or transmitted to a computing device (for example, information handling system 300). The seismic data 404 may be communicated or transmitted using any suitable device, mechanism or protocol, for example, as discussed above with respect to FIG. 4. The seismic data 404 is processed by the information handling system 300 to obtain a description of the subsurface famiation (for example, subterranean formation 112 of FIG. 1 and subterranean formation 210 of FIG. 2). In one or more embodiments, the base seismic data (such as seismic data 404) is collected as unordered raw data. The base seismic data is processed to maximize the useful bandwidth of the base seismic data to correct the structural representation, as closely as possible, to the subsurface description, for example, subsurface reflectivity. For example, the base seismic data is placed in a common gather to generate a single seismic image that represents the subsurface formation. In one or more embodiments, the base seismic data may be processed using any one or more methods or techniques including, but not limited to static correction, frequency filtering, normal moveout correction, velocity analysis, stacking and migration, or any combination thereof.

At step 502, initial petrophysics and rock physics analysis is performed to determine or generate one or more well logs. The petrophysics and rock physics analysis provides an understanding of the rock and fluids of the subsurface or subterranean formation and how the rock and fluids relate to the base seismic data. For example, one or more petrophysical properties including, but not limited to, porosity, thickness, resistivity, sonic, gamma ray, spontaneous potential, density, transit time, fluid identification and characterization, or any other property or log associated with collected well log data may be determined or identified using one or more models based, at least in part, on the processed seismic data 404 from step 500, for a given reservoir, such as subterranean formations 112 and 210 of FIGS. 1 and 2, respectively.

At step 504, one or more wavelets are estimated based, at least in part, on any one or more of the generated single seismic image, the petrophysics analysis, and the rock physics analysis. One or more synthetic seismic traces are generated based, at least in part, on one or more estimated wavelets. For example, sonic and density well logs may be used to generate or compute an impedance log. Reflection coefficients may be calculated at the step-changes of the impedance log and used to form a reflection coefficient series. The reflection coefficient series may be convolved with a pulse (extracted or estimated) to generate a synthetic seismic trace or a synthetic seismogram which is used to calibrate the well log to the actual or base seismic data. This well-to-seismic tie may include a synthetic seismogram constructed from a calibrated P-impedance log that is matched to a seismic trace. A filter is determined that corresponds to the bandwidth of the base seismic data. The filter is applied to the synthetic seismogram and the result is time and phase shifted to match the base seismic data, for example, seismic data 404. This determined filter is an estimated wavelet. The estimated wavelet may be determined using any one or more suitable techniques, methodologies or modeling.

At step 506, the one or more generated synthetic seismic traces are compared to the base seismic data, for example, seismic data 404 to determine if an appropriate or suitable estimated wavelet has been generated. If the synthetic seismic trace does not match within a predetermined threshold or degree of correlation the base seismic data, the method continues at step 504 to generate one or more additional estimated wavelets based on an adjustment to the wavelet phase, the well-tie to seismic, or both. If the synthetic seismic trace matches the base seismic data within a predetermined threshold or degree, the method continues at step 508 and it is determined whether modelled data (such as the synthetic seismic trace) is comparable to or within a predetermined range or threshold of a collected or measured data (such as the base seismic data). For example, a synthetic seismogram or a synthetic seismic trace may be compared to the base seismic data, a core measurement may be compared to a well log at a predetermined depth, and a geological mapping (physical property distribution for the subsurface) may be compared to a range of data from one or more well logs. Any other comparison or evaluation may be made to determine that the modelled data is comparable to the collected or measured data or accurately reflects the formation 112. If not comparable, one or more corrections may be made to one or more parameters of the model and the method continues at step 502. The one or more corrections may comprise one or more log corrections due to washout zones or borehole environment, a wavelet phase sensitivity analysis, an update of assumed matrix in a rock physics model, a property averaging in the well log, a well-tie to seismic or any combination thereof.

If comparability is determined at step 508, the method continues at step 510 where well log data filtering and subset creation occurs. For example, one or more spurious data points of the base seismic data may be removed, the data of one or more well logs is otherwise normalized or error correction is applied to create a subset of the base seismic data of the one or more well logs. At step 512, one or more spatial constraints are determined by fault interpretation of the subset of the base seismic data, horizon interpretation of the subset of the base seismic data or both.

At step 514, seismic inversion using one or more determined spatial constraints is performed based, at least in part, on the subset of the base seismic data, for example, seismic data 404. At step 516, a fine scale geocellular stratigraphic grid is built or generated based, at least in part, on stratigraphic framework incorporating at least one of the one or more spatial constraints. At step 518, the seismic inversion is blocked to the fine scale geocellular stratigraphic grid. At step 520, a lithotype proportion map or model is created based on log and seismic data or calculations from any of the previous steps.

At step 522, it is determined whether to constrain the petrophysical property model by a depositional facies model based, at least in part, on the lithotype proportion map or model and the seismic inversion blocked to the fine scale geocellular stratigraphic grid. For example, the subset of the base seismic data (such as seismic data 404) may be used to build a depositional facies model. If it is determined to constrain the petrophysical property model by a depositional facies model, the method continues to step 524 where facies modeling is performed. If it is determined not to constrain the petrophysical property model, the method continues at step 526. At step 526, petrophysical property modeling is performed.

At step 528, one or more subsurface flow unit properties (or rock type properties) and one or more reservoir fluid characteristics are collected. In one or more embodiments, one or more flow unit properties (or rock type properties) may include, but are not limited to, mineralogy, pore throat distribution, grain size distribution, relative permeability, capillary pressure, wettability or any combination thereof. In one or more embodiments, reservoir fluid characteristics may include, but are not limited to, pressure, volume and temperature (PVT), fluid model, one or more other subsurface fluid description, or any combination thereof.

At step 530, a flow simulation model is created and a flow simulation is generated. The flow simulation model is used to simulate multiphase flow through the reservoir to confirm and predict production of reservoir fluids from that reservoir. The flow simulation model may be based, at least in part, on any one or more models or parameters including, but not limited to, a petrophysical property model, fluid and rock-fluid description, and well scheduling. At step 532, it is determined if the modeled production from the flow simulation model correlates to a production history for a reservoir or subterranean formation of interest (for example, subterranean formations 112, 210 of FIGS. 1 and 2, respectively) for a user defined tolerance. If the flow simulation model does not correlate within a user defined tolerance with the available production history, the method continues at step 530 where a new flow simulation model is created or updated based on prior modeling efforts based on the petrophysical property model, one or more wellbore (for example, wellbore 108 in FIG. 1) properties, a fluid model, adjustments to relative permeability, permeability, water-oil contact (WOC), transmissibility and any one or more other parameters known to one of ordinary skill in the art. If the flow simulation model does correlate, a flow simulation forecast model is produced at step 534. The flow simulation forecast model maps or provides a prediction of hydrocarbon production from the subsurface formation, for example, subsurface environment 200 in FIG. 2. The flow simulation output of the flow simulation forecast model may comprise one or more three-dimensional property arrays of saturation, pressure and petro-elastic properties. The flow simulation output may be analyzed, for example, by a user or other software application, to determine one or more properties of flow of hydrocarbon production from the wellbore 108. One or more petro-elastic properties output from the flow simulation forecast model may be used for estimation of a wavelet for the monitor survey.

At step 536, the monitor seismic data is acquired. Monitor seismic data for a reservoir or subterranean formation of interest (for example, subterranean formations 112 and 210 in FIGS. 1 and 2, respectively) comprises seismic data acquired after a time-lapse. For example, base or initial seismic data may be acquired and subsequently, for example, after production of hydrocarbons has begun, monitor seismic data may be acquired. This monitor seismic data may be acquired in a similar manner as discussed above with respect to seismic data 404 in FIG. 4. The monitor seismic data may be acquired to analyze changes in the reservoir of interest due to this production of hydrocarbons after an interval of time has occurred. Any interval of time may occur prior to the acquisition of the monitor seismic data including, but not limited to, several months, one year, five years, ten years or any other interval of time. The monitor seismic data may be acquired over the same area or environment as the base seismic data to ensure continuity in the time-lapse signal.

At step 538, the monitor seismic data is processed or re-processed to obtain a seismic volume. For example, monitor seismic data may be used in time-lapse seismic reservoir monitoring where a comparison is made of three-dimensional seismic surveys at two or more points in time. The acquired monitor seismic data is generally unordered raw data. The processing and re-processing of the monitor seismic data maximizes the useful bandwidth to provide or display (for example, to provide or display to an operator or one of ordinary skill in the art) a correct structural image to represent, as closely as possible, the subsurface reflectivity. For example, the seismic data may be placed in a common gather and a single seismic image that represents the subsurface formation may be generated based on the common gather. The processing and re-processing may use the same one or more parameters utilized for the base seismic data processing at step 500. At step 540, a petro-elastic model (PEM), is produced or generated by a reservoir simulator at a predetermined output frequency. For example, the reservoir simulator may be a software application or program that receives inputs which describe a fluid model, rock-fluid interaction, petrophysical descriptions of porous media, wellbore descriptions (such as trajectories, constraints and schedules) and uses numerical modeling techniques to predict the multiphase flow of fluids in a reservoir being modeled. The predetermined output frequency is based, at least in part, on a rate of monitor seismic data acquisition. In one or more embodiments, the rate of monitor seismic data acquisition may be two, three, four, or six months, one year, or any other interval of time.

At step 542, one or more derived logs are extracted from the produced PEM, generated by the reservoir simulator, at actual and pseudo log locations such that the trajectory of the pseudo logs are vertical or substantially vertical and are located in the vicinity immediately surrounding the actual well trajectory. For example, the actual logs are collected using a downhole tool, the extracted logs are obtained from a priori determined log locations in the PEM computed by the reservoir simulation model and the pseudo logs are derived from user defined spatial locations in the PEM computed by the reservoir simulation model (for example, at step 542). The one or more derived logs may include, but are not limited to, one or more of impedance logs, density logs, and velocity logs.

At step 544, one or more monitor estimated wavelets are estimated based, at least in part, on the monitor seismic data. One or more monitor synthetic seismic traces are generated based, at least in part, on one or more of the derived logs from the PEM. Iterative monitor wavelet estimation for the monitor seismic data is performed based, at least in part, on the one or more logs derived from the PEM. For example, phase and amplitude spectra from actual-location and pseudo derived logs from the PEM or fluid substitution may be utilized to determine the one or more monitor estimated wavelets.

At step 546, the one or more generated monitor synthetic seismic traces are compared to the monitor seismic survey. The monitor seismic survey is performed over the same area as that for the base seismic data acquired at step 500 to evaluate changes in the reservoir resulting from a production operation. If the synthetic seismic traces match the monitor seismic survey, then at step 548 seismic inversion of the monitor seismic survey is performed. At step 550 it is determined if the inversion of the monitor seismic survey matches the PEM. For example, a three-dimensional geocellular based comparison or correlation of the inverted monitor seismic survey and the PEM from the flow simulation may be performed where the degree of correlation is in terms of impedance amplitude and spatial distribution description between the inverted monitor seismic and the PEM. If a match occurs, at step 552, at least one of one or more well services or production operations may be altered including, but not limited to, production schedule, rate of production, by-passed pay, well-planning or workflow, frequency of seismic acquisition or any other wellbore environment parameter or operating condition may be altered, changed, updated or otherwise manipulated for a given site, for example, wellbore environments 100 and 200 in FIGS. 1 and 2, respectively. For example, the monitor seismic survey may indicate additional hydrocarbon production is available from a current wellbore, or that one or more other wellbores may be drilled to obtain additional hydrocarbon production. In one or more embodiments, a schedule for plugging, workover, abandoning, or any combination thereof may be created, altered or changed based, at least in part, on the monitor seismic survey.

If a match does not occur, then at step 554 it is determined if the flow simulation model from step 530 needs to be revised. The determination that the flow simulation model needs to be revised may be based, at least in part, on one or more factors. The one or more factors may include, but are not limited to, similitude in impedance description for the PEM and inverted monitor seismic (in non-reservoir and reservoir regions), and performing comparison of predicted production versus actual production from the simulated period. If it is determined that the flow simulation model does not need to be revised then the method continues at step 538 with accounting for impedance amplitude and spatial distribution discrepancies.

If it is determined that the flow simulation forecast model needs to be revised at step 554, then at step 556, the flow simulation model is revised. For example, one or more of the petrophysical model, rock-fluid description, pressure, volume, temperature and water level are changed. At step 558, the PEM is revised. For example, the elastic model may be changed by changing one or more elastic properties including, but not limited to, mineral bulk modulus, shear modulus and matrix density. These one or more elastic properties that are change are inputs for the petro-elastic model. Once the PEM is revised at step 558, the method continues at step 550.

If at step 546, the generated monitor synthetic seismic traces do not match the monitor seismic survey, then at step 560 it is determined if the seismic inversion of the monitor seismic survey needs to be revised. For example, the seismic inversion may be revised if the simulated production that was once forecasted matches the actual production from the field for a given elapsed time. If at step 560, the seismic inversion needs to be revised, then at step 562, the seismic inversion is revised and the method continues at step 546. The seismic inversion may be revised based, at least in part, on an adjustment in the wavelet or an update to the well-tie to seismic. If it is determined that the seismic inversion does not need to be revised, then at step 564, it is determined if the PEM needs to be revised. For example, the PEM may be revised based, at least in part, on differences in over, under or side burden impedance that exist in the PEM but not in the seismic inversion which are spurious given the modeled system in the reservoir simulator. If the PEM needs to be revised, then the method continues at step 558. If the PEM does not need to be revised, the method continues at step 548.

While one or more aspects of the present disclosure are discussed with respect to seismic data associated with a wellbore environment, the present disclosure contemplates that one or more embodiments may comprise utilizing one or more steps of FIGS. 5A and 5B with geospatial imaging, for example.

In one or more embodiments, a method for determining one or more operations for a subterranean formation comprising receiving a first seismic data of an area of the subterranean formation, wherein the first seismic data is associated with a first instance of time, estimating one or more wavelets based, at least in part, on the first seismic data, generating one or more synthetic seismic traces based, at least in part, on the one or more estimated wavelets, performing seismic inversion using one or more determined spatial constraints based, at least in part, on the first seismic data, creating a flow simulation forecast model, acquiring a monitor seismic data, generating a petro-elastic model (PEM) based, at least in part, on a rate of acquisition of the monitor seismic data, estimating one or more monitor estimated wavelets based, at least in part, on the monitor seismic data, generating one or more monitor synthetic seismic traces based, at least in part, on one or more derived logs from the PEM, comparing the one or more monitor synthetic seismic traces to a monitor seismic survey and altering the one or more well services or production operations based, at least in part, on the comparison. In one or more embodiments, the method further comprises placing the first seismic data in a common gather and generating a single seismic image based on the common gather, wherein the estimated wavelet is based, at least in part, on the single seismic image. In one or more embodiments, the method further comprises comparing the one or more generated synthetic seismic traces to the seismic data and estimating a second one or more wavelets, wherein generating the one or more synthetic seismic traces is based on the second one or more wavelets. In one or more embodiments, the method further comprises comparing the one or more synthetic seismic traces to the first seismic data to determine if the one or more synthetic seismic traces are within a predetermined threshold of the first seismic data. In one or more embodiments, the method further comprises performing petrophysics analysis and rock physics analysis, generating one or more well logs based, at least in part, on the petrophysics analysis and the rock physics analysis, removing one or more spurious data points of the one or more well logs and creating a subset of the one or more well logs by normalizing the one or more well logs. In one or more embodiments, the method further comprises generating a fine scale geocellular stratigraphic grid based, at least in part, on a stratigraphic framework, wherein the stratigraphic framework incorporates at least one of the one or more spatial constraints and blocking the seismic inversion to the fine scale geocellular stratigraphic grid. In one or more embodiments, the method further comprises constraining a petrophysical property model by a depositional facies model based, at least in part, on a lithotype proportion map and wherein the flow simulation model is created based, at least in part, on the petrophysical property model.

In one or more embodiments, a non-transitory computer readable storage medium storing one or more instructions, that when executed by a processor, cause the processor to receive a first seismic data of an area of a subterranean formation, wherein the first seismic data is associated with a first instance of time, estimate one or more wavelets based, at least in part, on the first seismic data, generate one or more synthetic seismic traces based, at least in part, on the one or more estimated wavelets, perform seismic inversion using one or more determined spatial constraints based, at least in part, on the first seismic data, create a flow simulation forecast model, acquire monitor seismic data, generate a petro-elastic model (PEM) based, at least in part, on a rate of acquisition of the monitor seismic data, estimate one or more monitor estimated wavelets based, at least in part, on the monitor seismic data, generate one or more monitor synthetic seismic traces based, at least in part, on one or more derived logs from the PEM, compare the one or more monitor synthetic seismic traces to a monitor seismic survey, and alter one or more well services or production operations based, at least in part, on the comparison. In one or more embodiments, the one or more instructions, that when executed by the processor, further cause the processor to place the first seismic data in a common gather and generate a single seismic image based on the common gather, wherein the estimated wavelet is based, at least in part, on the single seismic image. In one or more embodiments, the one or more instructions, that when executed by the processor, further cause the processor to compare the one or more generated synthetic seismic traces to the seismic data and estimate a second one or more wavelets, wherein generating the one or more synthetic seismic traces is based on the second one or more wavelets. In one or more embodiments, the one or more instructions, that when executed by the processor, further cause the processor to compare the one or more synthetic seismic traces to the first seismic data to determine if the one or more synthetic seismic traces are within a predetermined threshold of the first seismic data. In one or more embodiments, the one or more instructions, that when executed by the processor, further cause the processor to perform petrophysics analysis and rock physics analysis, generate one or more well logs based, at least in part, on the petrophysics analysis and the rock physics analysis, remove one or more spurious data points of the one or more well logs and create a subset of the one or more well logs by normalizing the one or more well logs. In one or more embodiments, the one or more instructions, that when executed by the processor, further cause the processor to generate a fine scale geocellular stratigraphic grid based, at least in part, on a stratigraphic framework, wherein the stratigraphic framework incorporates at least one of the one or more spatial constraints and block the seismic inversion to the fine scale geocellular stratigraphic grid. In one or more embodiments, the one or more instructions, that when executed by the processor, further cause the processor to constrain a petrophysical property model by a depositional facies model based, at least in part, on a lithotype proportion map and wherein the flow simulation model is created based, at least in part, on the petrophysical property model.

In one or more embodiments, an information handling system comprises a memory, a processor coupled to the memory, wherein the memory comprises one or more instructions executable by the processor to receive a first seismic data of an area of the subterranean formation, wherein the first seismic data is associated with a first instance of time, estimate one or more wavelets based, at least in part, on the first seismic data, generate one or more synthetic seismic traces based, at least in part, on the one or more estimated wavelets, perform seismic inversion using one or more determined spatial constraints based, at least in part, on the first seismic data, create a flow simulation forecast model, acquire monitor seismic data, generate a petro-elastic model (PEM) based, at least in part, on a rate of acquisition of the monitor seismic data, estimate one or more monitor estimated wavelets based, at least in part, on the monitor seismic data, generate one or more monitor synthetic seismic traces based, at least in part, on one or more derived logs from the PEM, compare the one or more monitor synthetic seismic traces to a monitor seismic survey and alter one or more well services or production operations based, at least in part, on the comparison. In one or more embodiments, the one or more instructions are further executable by the processor to place the first seismic data in a common gather and generate a single seismic image based on the common gather, wherein the estimated wavelet is based, at least in part, on the single seismic image. In one or more embodiments, the one or more instructions are further executable by the processor to compare the one or more generated synthetic seismic traces to the seismic data and estimate a second one or more wavelets, wherein generating the one or more synthetic seismic traces is based on the second one or more wavelets. In one or more embodiments, the one or more instructions are further executable by the processor to compare the one or more synthetic seismic traces to the first seismic data to determine if the one or more synthetic seismic traces are within a predetermined threshold of the first seismic data. In one or more embodiments, the one or more instructions are further executable by the processor to perform petrophysics analysis and rock physics analysis, generate one or more well logs based, at least in part, on the petrophysics analysis and the rock physics analysis, remove one or more spurious data points of the one or more well logs and create a subset of the one or more well logs by normalizing the one or more well logs. In one or more embodiments, the one or more instructions are further executable by the processor to generate a fine scale geocellular stratigraphic grid based, at least in part, on a stratigraphic framework, wherein the stratigraphic framework incorporates at least one of the one or more spatial constraints and block the seismic inversion of the fine scale geocellular stratigraphic grid.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention.

A number of examples have been described. Nevertheless, it will be understood that various modifications can be made. For example, any one or more steps of FIG. 5A and FIG. 5B may be performed simultaneously, substantially simultaneous, in any order, or not at all. Accordingly, other implementations are within the scope of the following claims.

What is claimed is:

1. A method for altering one or more well services or production operations for a subterranean formation, comprising:
    receiving a first seismic data of an area of the subterranean formation, wherein the first seismic data is associated with a first instance of time;
    estimating one or more wavelets based, at least in part, on the first seismic data that comprises an impedance log;
    generating one or more synthetic seismic traces based, at least in part, on the one or more estimated wavelets;
    performing seismic inversion using one or more determined spatial constraints based, at least in part, on the first seismic data;
    creating a flow simulation forecast model;
    acquiring monitor seismic data;
    generating a petro-elastic model (PEM) based, at least in part, on a rate of acquisition of the monitor seismic data;
    generating one or more monitor synthetic seismic traces based, at least in part, on one or more derived logs from the PEM;
    estimating one or more monitor estimated wavelets based, at least in part, on the one or more derived logs from the PEM,
    comparing the one or more monitor synthetic seismic traces to a monitor seismic survey; and
    altering the one or more well services or production operations based, at least in part, on the comparison.

2. The method of claim 1, further comprising:
    placing the first seismic data in a common gather; and
    generating a single seismic image based on the common gather, wherein the estimated wavelet is based, at least in part, on the single seismic image.

3. The method of claim 1, further comprising:
    comparing the one or more generated synthetic seismic traces to the seismic data; and
    estimating a second one or more wavelets, wherein generating the one or more synthetic seismic traces is based on the second one or more wavelets.

4. The method of claim 1, further comprising comparing the one or more synthetic seismic traces to the first seismic data to determine if the one or more synthetic seismic traces are within a predetermined threshold of the first seismic data.

5. The method of claim 1, further comprising:
    performing petrophysics analysis and rock physics analysis;
    generating one or more well logs based, at least in part, on the petrophysics analysis and the rock physics analysis;
    removing one or more spurious data points of the one or more well logs; and
    creating a subset of the one or more well logs by normalizing the one or more well logs.

6. The method of claim 1, further comprising:
    generating a fine scale geocellular stratigraphic grid based, at least in part, on a stratigraphic framework, wherein the stratigraphic framework incorporates at least one of the one or more spatial constraints; and
    blocking the seismic inversion to the fine scale geocellular stratigraphic grid.

7. The method of claim 1, further comprising:
    constraining a petrophysical property model by a depositional facies model based, at least in part, on a lithotype proportion map; and
    wherein the flow simulation model is created based, at least in part, on the petrophysical property model.

8. A non-transitory computer readable storage medium storing one or more instructions, that when executed by a processor, cause the processor to:
    receive a first seismic data of an area of a subterranean formation, wherein the first seismic data is associated with a first instance of time;
    estimate one or more wavelets based, at least in part, on the first seismic data that comprises an impedance log;
    generate one or more synthetic seismic traces based, at least in part, on the one or more estimated wavelets;
    perform seismic inversion using one or more determined spatial constraints based, at least in part, on the first seismic data;
    create a flow simulation forecast model;
    acquire monitor seismic data;
    generate a petro-elastic model (PEM) based, at least in part, on a rate of acquisition of the monitor seismic data;
    generate one or more monitor synthetic seismic traces based, at least in part, on one or more derived logs from the PEM;
    estimate one or more monitor estimated wavelets based, at least in part, on the one or more derived logs from the PEM,
    compare the one or more monitor synthetic seismic traces to a monitor seismic survey; and
    alter one or more well services or production operations based, at least in part, on the comparison.

9. The non-transitory computer readable storage medium of claim 8, wherein the one or more instructions, that when executed by the processor, further cause the processor to:
    placing the first seismic data in a common gather; and
    generate a single seismic image based on the common gather, wherein the estimated wavelet is based, at least in part, on the single seismic image.

10. The non-transitory computer readable storage medium of claim 8, wherein the one or more instructions, that when executed by the processor, further cause the processor to:
    compare the one or more generated synthetic seismic traces to the seismic data; and estimate a second one or more wavelets, wherein generating the one or more synthetic seismic traces is based on the second one or more wavelets.

11. The non-transitory computer readable storage medium of claim 8, wherein the one or more instructions, that when executed by the processor, further cause the processor to compare the one or more synthetic seismic traces to the first seismic data to determine if the one or more synthetic seismic traces are within a predetermined threshold of the first seismic data.

12. The non-transitory computer readable storage medium of claim 8, wherein the one or more instructions, that when executed by the processor, further cause the processor to:
perform petrophysics analysis and rock physics analysis;
generate one or more well logs based, at least in part, on the petrophysics analysis and the rock physics analysis;
remove one or more spurious data points of the one or more well logs; and
create a subset of the one or more well logs by normalizing the one or more well logs.

13. The non-transitory computer readable storage medium of claim 8, wherein the one or more instructions, that when executed by the processor, further cause the processor to:
generate a fine scale geocellular stratigraphic grid based, at least in part, on a stratigraphic framework, wherein the stratigraphic framework incorporates at least one of the one or more spatial constraints; and
block the seismic inversion to the fine scale geocellular stratigraphic grid.

14. The non-transitory computer readable storage medium of claim 8, wherein the one or more instructions, that when executed by the processor, further cause the processor to:
constrain a petrophysical property model by a depositional facies model based, at least in part, on a lithotype proportion map; and
wherein the flow simulation model is created based, at least in part, on the petrophysical property model.

15. An information handling system comprising:
a non-transitory memory;
a processor coupled to the memory, wherein the memory comprises one or more instructions executable by the processor to:
receive a first seismic data of an area of the subterranean formation, wherein the first seismic data is associated with a first instance of time;
estimate one or more wavelets based, at least in part, on the first seismic data that comprises an impedance log;
generate one or more synthetic seismic traces based, at least in part, on the one or more estimated wavelets;
perform seismic inversion using one or more determined spatial constraints based, at least in part, on the first seismic data;
create a flow simulation forecast model;
acquire monitor seismic data;
generate a petro-elastic model (PEM) based, at least in part, on a rate of acquisition of the monitor seismic data;
generate one or more monitor synthetic seismic traces based, at least in part, on one or more derived logs from the PEM;
estimate one or more monitor estimated wavelets based, at least in part, on the one or more derived logs from the PEM;
compare the one or more monitor synthetic seismic traces to a monitor seismic survey; and
alter one or more well services or production operations based, at least in part, on the comparison.

16. The information handling system of claim 15, wherein the one or more instructions are further executable by the processor to:
place the first seismic data in a common gather; and
generate a single seismic image based on the common gather, wherein the estimated wavelet is based, at least in part, on the single seismic image.

17. The information handling system of claim 15, wherein the one or more instructions are further executable by the processor to:
compare the one or more generated synthetic seismic traces to the seismic data; and
estimate a second one or more wavelets, wherein generating the one or more synthetic seismic traces is based on the second one or more wavelets.

18. The information handling system of claim 15, wherein the one or more instructions are further executable by the processor to compare the one or more synthetic seismic traces to the first seismic data to determine if the one or more synthetic seismic traces are within a predetermined threshold of the first seismic data.

19. The information handling system of claim 15, wherein the one or more instructions are further executable by the processor to:
perform petrophysics analysis and rock physics analysis;
generate one or more well logs based, at least in part, on the petrophysics analysis and the rock physics analysis;
remove one or more spurious data points of the one or more well logs; and
create a subset of the one or more well logs by normalizing the one or more well logs.

20. The information handling system of claim 15, wherein the one or more instructions are further executable by the processor to:
generate a fine scale geocellular stratigraphic grid based, at least in part, on a stratigraphic framework, wherein the stratigraphic framework incorporates at least one of the one or more spatial constraints; and
block the seismic inversion to the fine scale geocellular stratigraphic grid.

* * * * *